(12) United States Patent
Müller

(10) Patent No.: US 11,938,683 B2
(45) Date of Patent: Mar. 26, 2024

(54) FLANGE STABILIZER FOR A SHAPED ARTICLE OF FIBER MATERIAL, SHAPED ARTICLE, METHOD FOR MAKING A SHAPED ARTICLE, AND USE OF A FLANGE STABILIZER

(71) Applicant: Technische Universität Dresden, Dresden (DE)

(72) Inventor: Tobias Müller, Dresden (DE)

(73) Assignee: Technische Universität Dresden, Dresden (DE)

( * ) Notice: Subject to any disclaimer, the term of this patent is extended or adjusted under 35 U.S.C. 154(b) by 198 days.

(21) Appl. No.: 17/345,007

(22) Filed: Jun. 11, 2021

(65) Prior Publication Data

US 2021/0387427 A1     Dec. 16, 2021

(30) Foreign Application Priority Data

Jun. 11, 2020  (DE) .................... 102020115546.8

(51) Int. Cl.
  *B29C 65/00*     (2006.01)
  *B29C 51/04*     (2006.01)
  *B29L 31/00*     (2006.01)

(52) U.S. Cl.
  CPC ............ *B29C 66/131* (2013.01); *B29C 51/04* (2013.01); *B29C 66/53461* (2013.01); *B29C 66/8322* (2013.01); *B29L 2031/7132* (2013.01)

(58) Field of Classification Search
  CPC ..................... B29C 66/8322; B29L 2031/7132
  USPC ........................................................ 264/299
  See application file for complete search history.

(56) References Cited

U.S. PATENT DOCUMENTS

2010/0301109 A1     12/2010  Brands
2015/0352780 A1*    12/2015  Messerschmid ........ B31B 50/00
                                                   156/189

FOREIGN PATENT DOCUMENTS

| CH | 709802 | * | 12/2015 |
|---|---|---|---|
| DE | 2640479 A1 | | 3/1977 |
| DE | 3102061 A1 | | 12/1981 |
| DE | 68905745 T2 | | 4/1990 |
| DE | 4009508 C2 | | 10/1990 |
| DE | 9319903 U1 | | 3/1994 |
| JP | 857159615 U | | 10/1982 |
| JP | H0338713 U | | 4/1991 |
| JP | H0584637 U | | 11/1993 |
| JP | 200333932 A | | 12/2000 |
| JP | 2002120821 A1 | | 4/2002 |

(Continued)

*Primary Examiner* — James D Sells
(74) *Attorney, Agent, or Firm* — Michael Soderman

(57) ABSTRACT

A shaped article, a method for making it, and its use. The shaped article is formed from flat fiber material and has a bottom (2), a body (4), and an opening, which is surrounded by a circumferential flange (6). The shaped article (1) comprises a flange stabilizer (10) attached to the second flat side (18) of the flange (6) facing the bottom (2). The flange stabilizer (10) is disc-shaped and has an inner contour (12) corresponding to the desired cross-sectional shape of the shaped article (1) in the region of the opening and can be slipped over the body (4) in the region of the bottom (2) and up to the flange (6). The flat sides (16, 18) of the flange stabilizer (10) extend essentially parallel to the flange (6), defining and stabilizing the cross-sectional shape of the body (4) in the region of the opening and the flange.

8 Claims, 3 Drawing Sheets

(56) References Cited

FOREIGN PATENT DOCUMENTS

WO 2004103845 A2 12/2004

* cited by examiner

FLANGE STABILIZER FOR A SHAPED ARTICLE OF FIBER MATERIAL, SHAPED ARTICLE, METHOD FOR MAKING A SHAPED ARTICLE, AND USE OF A FLANGE STABILIZER

CROSS REFERENCE TO RELATED APPLICATIONS

This application claims the priority of DE 102020115546.8 filed on 2020 Jun. 11; this application is incorporated by reference herein in its entirety.

BACKGROUND

The invention relates to a shaped article shaped from a flat fiber material and having a bottom, a body and an opening, the opening being surrounded by a circumferential flange. The invention further relates to a method for making a shaped article by shaping from a planar blank of a fiber material, the shaped article having a bottom, a body and an opening, the opening being surrounded by a circumferential flange which is provided with a flange stabilizer. The invention also relates to a use of a flange stabilizer on a shaped article made by shaping from a planar blank of a fiber material, the shaped article having a bottom, a body and an opening, the opening being surrounded by a circumferential flange which is provided with the flange stabilizer. Eligible fiber materials are in particular paper or cardboard.

Packaging materials with a flange stabilizer are known from the prior art. DE 31 02 061 A1 describes a flange stabilizer, referred to here as a gripping ring, for a neck of a container, the gripping ring consisting of a separately manufactured, disc-like unit made of, for example, plastic or cardboard. The gripping ring has an opening that is matched to the neck in such a way that it is possible to fix the gripping ring on a predetermined area of the neck. Fixing is done by different methods, for example by tight fit, by shrinking on, by nose-like elevations or expansions at the neck which surround the gripping ring, by spring force in the case of tabs in the opening. The proposed solution enables lower material consumption, higher dimensional stability of the neck, the possibility of using large diameter gripping rings and the use of the gripping rings as information carriers. However, the gripping ring is configured to be connected to the container exclusively at its inner circle and, in particular, is not suitable or intended to be combined with a shaped article made of a fiber material by compression drawing, to be attached to its drawing collar and to define its dimensions. In addition, the proposed gripping ring must be of such a rigid design that it alone can bear the intended loads, i.e. both the radial pressure from the opening and the axial load when the container is carried at the gripping ring.

According to DE 40 09 508 C2, a carrier 2 is provided which holds blanks 1 in a container shape and connects multiple containers. However, the containers are only folded from the blank 1, and the carrier 2 is not suitable to be used with a reshaped or compression-drawn shaped article. In addition, the outward force is also absorbed by the inner contour, which also requires high inherent stiffness.

It is also known for cylindrical containers such as cans or drums to arrange a flange stabilizer around the opening to achieve stability, in particular for tightly closing attachment of a lid. Pertinent solutions are disclosed in DE 93 19 903 U1, DE 689 05 745 T2 and WO 2004/103845 A2. In this case, however, the flange stabilizer is either directly the corresponding element to the lid or the flange stabilizer is formed from the material of the container itself.

In contrast, DE 26 40 479 A1 describes a flange stabilizer for use on a frustoconical cardboard cup for dairy products. However, the cup is frustoconical in such a way that it has a larger diameter at the bottom than at the opening. Thus, it cannot be produced by reshaping or compression drawing, but is shaped from a blank. In addition, the flange stabilizer is adapted to the frustoconical shape of the cup and is itself configured as a frustoconical plastic part. It therefore forms a substantially cylindrical reinforcement arranged on the inside or outside of the cup rim, which has an orientation parallel to the cup wall in the manner of a banderol. The plastic part hinders a sorted recycling of the cup. Even if a cardboard banderol were used instead, the joining point of the banderol then required represented additional expense and at the same time a weak point. In addition, mounting the plastic part requires appropriate preparation of the mounting area, e.g. a groove.

JP 2000-333 932 A discloses the stabilization of a paper cup against accidental pressing open in the hand, i.e. against external forces. For this purpose, the curled edge is pressed. In addition, a ring is slid on and connected to the pressed curl using ultrasonic sealing technology. Accordingly, the ring is fastened using two mechanisms, i.e. fiber hooking by pressing and further by joining by means of a sealable, in particular thermoplastic layer. Therefore, in order to use both mechanisms, a (polymeric) sealing layer is necessary; frictional forces of the materials involved are not used. As a result, increased demands are placed on the material, and fastening operations are necessary.

JP 2002-120 821 A describes the application of an auxiliary ring to a pressed curl or rolled rim. Here, the ring is applied from above and can therefore only have a stabilizing effect in the case of a bonded connection. The ring is primarily used for safe, mechanical destacking of the cup. This applies equally to the different embodiments as shown in FIGS. 3, 4 and 5. In FIG. 4, an additional element can be seen below the curl. Thus, here too, increased demands are placed on the material in order to achieve fastening, and additional operations are necessary for fastening the ring.

In particular, the prior art does not solve the problem of restoring of reshaped cardboard containers after the shaping process and the associated loss of dimensional stability and accuracy. To minimize restoring and loss of dimensional accuracy, the following methods have been used so far:

- calibration (and drying) of the shaped article immediately after the shaping process;
- control of reshaping parameters to mitigate internal stresses in the material;
- storage of the shaped articles under constant climatic conditions (temperature and humidity); or
- prevention of mechanical stresses on the shaped articles before closing.

Until now, dimensional accuracy of the shaped articles was only possible within large shape or dimensional tolerances. Furthermore, known shaped articles react very sensitively to climatic fluctuations (especially humidity). The necessary control of reshaping parameters in industrial facilities is very difficult to realize. The aforementioned sensitivity of the shaped articles to climatic and mechanical stresses increases the processing effort. The challenges to be overcome in this process make packaging components shaped from cardboard according to the prior art uneconomical or technically unfeasible for many users.

SUMMARY

The invention relates to a shaped article, a method for making it, and its use. The shaped article is formed from a flat fiber material and has a bottom (2), a body (4), and an opening, the opening being surrounded by a circumferential flange (6). According to the invention, the shaped article (1) comprises a flange stabilizer (10) attached to the second flat side (18) of the flange (6) facing the bottom (2). The flange stabilizer (10) is disc-shaped and has an inner contour (12) which corresponds to the desired cross-sectional shape of the shaped article (1) in the region of the opening and can be slipped over the body (4) in the region of the bottom (2) and up to the flange (6). The flat sides (16, 18) of the flange stabilizer (10) extend essentially parallel to the flange (6), defining and stabilizing the cross-sectional shape of the body (4) in the region of the opening and the flange (6).

DETAILED DESCRIPTION

It is therefore the object of the present invention to propose a shaped article, a method for making a shaped article with a flange stabilizer, and a use of a flange stabilizer with which it is possible to prevent restoring of reshaped cardboard containers after the shaping process and the associated loss of dimensional stability and accuracy with a minimum of material and manufacturing effort.

The object of the invention is achieved by a shaped article which has been produced by reshaping a flat, in particular planar, fiber material and has a bottom, a body which surrounds or runs around of the bottom in a cylindrical shape, and an opening. The opening is surrounded by a circumferential flange that projects essentially perpendicularly from the body. The shaped article may be, for example, a cup made of paperboard.

According to the invention, the shaped article is made of at least two parts and the flange comprises a flange stabilizer attached to the flat side of the flange facing the ground, i.e. the bottom side. The flange stabilizer is disc-shaped and has an inner contour that corresponds to the desired cross-sectional shape of the shaped article in the region of the opening. The flange stabilizer can be stripped over the body in the bottom region and up to the flange. The flat sides of the flange stabilizer extend essentially parallel to the flange. The flange stabilizer fixes and stabilizes the cross-sectional shape of the body in the region of the opening and the flange, and thus the shape of the entire shaped article. In this respect, although the flange stabilizer primarily stabilizes the flange, it is ultimately responsible for the final shape of the shaped article. This is due to the fact that after the shaping, as soon as the body leaves the die, it tends to return to the original, flat shape due to restoring forces. This effect is also referred to as restoring. Only the flange stabilizer prevents this and returns the body to the desired shape initially created during shaping and holds it in this shape. This process is also known as shape fixation, because it prevents undesired restoring and thus loss of the shape even at a later stage, for example under unfavorable climatic influences.

The flange stabilizer is preferably attached by friction fitting, pressing, gluing, sticking or sealing. In the case of frictional fitting, the flange stabilizer is clamped with its inner contour onto the outer surface of the body, especially when the latter is urging against the inner contour of the flange stabilizer due to the restoring force. Gluing or sticking, as well as pressing, are preferably performed on the bottom side of the flange.

The shaped article is preferably made by compression drawing. In the compression drawing process, the fiber material is clamped during compression drawing into a blank holder to which a defined force is applied and, insofar as it is separated from the fiber material by means of a relief cut, is drawn into a clearance between a drawing sleeve and a punch. The dimension of the clearance is smaller than the thickness of the fiber material, so that compression of the fiber material occurs in the clearance and during drawing. The differences to other, externally similar reshaping processes are explained below.

The reshaping of plastics or metals on the one hand and the reshaping of fiber material (explained below using cardboard as an example) on the other hand are so fundamentally different from each other that, despite certain external similarities, a transfer of technological solutions is not possible. Plastic films are reshaped into 3D shaped articles through thermoforming, which is often misleadingly referred to in practice as deep drawing. Thermoforming of plastics is based on heating the material to a temperature at which the material exhibits pronounced flow behavior. The material is completely fixed on all sides and then, with the help of its plastic deformation capacity (primarily elongation in ranges of 30-300%), it is drawn into shape fluidly out of its thickness. The material thickness of the shaped article is therefore significantly lower than that of the starting material. Fluidic pressure media (compressed air, vacuum) are usually used for thermoforming. The material is preheated in a controlled manner to achieve its fluid state and cooled in the molds to solidify again.

However, unlike thermoforming, the definition of deep drawing as such includes reshaping from a flat blank without purposefully changing the thickness. Accordingly, both processes are technologically fundamentally different and also subject to correspondingly different conditions when implemented in machines. For this reason, conventional thermoforming machines and the technological solutions they follow are not suitable for reshaping cardboard. Cardboard and all other fiber materials in particular do not exhibit any pronounced flow behavior, especially not at multiaxial elongation. Even with specially finished special grades, elongations of only 2 to 12% can be achieved.

When deep drawing sheet metal, a blank lying flat (circular blank) is clamped with a blank holder and a defined force is applied. The punch usually draws the material into the drawing ring in a cold state. Flow occurs in the material due to the stress condition, which compensates for the geometrically determined excess material in the clearance between the punch and the drawing ring. The material is only stressed to the yield point, preventing wrinkles and tears. The clearance is larger than the material thickness. The surface contact with the drawing ring is dissolved immediately after shaping in order to avoid the extremely high friction in the further process sequence.

Compression drawing of cardboard, while similar to thermoforming in tooling arrangement and superficially, differs significantly in material exposure, physical effects and machine requirements. The flat lying cardboard blank is subjected to a defined force by a blank holder and the punch draws the cardboard into a drawing sleeve whose clearance relative to the punch is smaller than the material thickness, which represents a serious difference between compression drawing and deep drawing of metal. Due to the fiber material, which unlike metal is not flowable, folds occur which are not prevented but are a characteristic part of the process. The thermally assisted compression in the thickness direction of the material in the drawing sleeve directly after passing the reshaping radius fixes the folds and ensures the shape retention of the shaped articles. The folds extend to below the blank holder and cause the shaped articles to thicken considerably.

In compression drawing, drying out the material is a key task to achieve new bonds in the cellulosic fiber structure and minimize shape deviation. For this purpose, the drawing sleeve and its exposure time under compression are important. The inhomogeneity, anisotropy and hygroscopicity of the material, as well as compression in the thickness direction as a specific process basis, require a completely different mode of operation of machines, oriented to the material behavior. The adoption of characteristics and solutions from the more distant fields of thermoforming or deep drawing of metal is not possible. Multidimensional reshaping exhausts the application potential of the materials. For fiber materials such as nonwovens, paper, cardboard and paperboard, multidimensional reshaping with a low reshaping ratio by embossing has been common so far. The drawing process of compression drawing, on the other hand, has high application potential for the production of hollow bodies closed on one side with a high reshaping ratio.

According to an advantageous embodiment of the shaped article, the flange stabilizer is connected to the flange on its bottom side by sealing, so that the flange is configured as a sealing rim. It has also proved advantageous if a lid is sealed onto the flange serving as the sealing rim. The lid serves as a closure of the opening of the shaped article, especially when it is used for packaging.

The flange stabilizer for arrangement on the shaped article, as described above, is disc-shaped and has an inner contour that corresponds to the desired cross-sectional shape of the shaped article in the region of the opening or flange. The flange stabilizer can be stripped over the body in the bottom region and up to the flange, which forms a stop. The flange stabilizer extends with its flat sides essentially parallel to the orientation of the flange. The flange stabilizer is configured as an annular disk, which may also have other closed contours instead of a circular contour. The contour, in particular the inner contour, depends on the desired cross-sectional shape of the shaped article in the region of the opening or flange. The slipped-on flange stabilizer stabilizes the shape of the body and the flange, as the flange stabilizer prevents the shape from bending back or restoring and prevents dimensional variations due to climatic conditions, especially humidity.

Shape retention, i.e. the conformance of the intended ideal shape to the actual shape of the shaped article, is improved by the invention and can be achieved largely independently of the reshaping parameters. Even climatic influences (humidity, temperature) have hardly any negative effect on the shape of the shaped article. The shaped article is stabilized by the flange stabilizer and is also more robust against mechanical loads. The basic dimensions of the shaped article (especially the diameter) are not changed by the flange stabilizer, so that no or only very minor adjustments to the associated processing equipment are necessary.

The preferred embodiment of the flange stabilizer is cut from a flat fiber material, alternatively plastic, with closed inner and outer contours. This enables simple and fast production because the flange stabilizer can be punched or cut out with the correct dimensions and does not have to be laboriously applied or glued to the shaped article, as is the case, for example, with a ring aligned parallel to the wall.

It has proved advantageous for the flange stabilizer to have a ring width (in the case of a ring shape) or generally a web width of 3 to 5 mm if the inner contour is circular or oval. In the case of an internal contour that is shaped other than circular or oval, the preferred flange stabilizer has a web width of 4 to 10 mm. The effect according to the invention is thus achieved with minimal material input and without any undesirable visible changes to the shaped article.

The object of the present invention is further achieved by a method for making a shaped article by shaping from a planar blank of a fiber material, the shaped article having a bottom, a body and an opening, the opening being surrounded by a circumferential flange which is provided with a flange stabilizer.

According to the invention, the flange stabilizer is pressed against the flange from the bottom over the body. The flange stabilizer contracts the shaped article in the region of the flange to the desired cross-sectional shape of the shaped article in the region of the opening against a restoring force, defining and stabilizing the cross-sectional shape of the shaped article in the region of the opening.

During this process, according to an advantageous embodiment, the flange stabilizer is clamped onto the body by frictional fitting or, according to a further advantageous embodiment, is connected to the flange. If it is connected to the flange, this is done by gluing, sticking or sealing.

A connection between the flange stabilizer and the flange which is also aesthetically advantageous is achieved by pressing the flange stabilizer to the flange. Such additional mechanical pressing of the flange stabilizer to the flange or sealing rim produces a high optical quality of the shaped article according to the invention. The fixation by the flange stabilizer can thus be concealed well and can only be seen when looking closely. Alternatively, the flange stabilizer can also be printed or colored and serve as a design element. This is achieved mainly by an increased surface area, a projection.

Another aspect of the present invention relates to a use of a flange stabilizer. This is performed on a shaped article made by shaping from a flat blank of a fiber material, the shaped article having a bottom, a body and an opening, the opening being surrounded by a circumferential flange that is provided with the flange stabilizer. According to the invention, the flange stabilizer is used in the region of an opening, in particular on the flange surrounding it, of a shaped article by slipping it over the body. The desired cross-sectional shape of the shaped article in the region of the opening is thus defined and stabilized. As long as the flange is provided with the flange stabilizer, any arrangement of the flange stabilizer in the region of the opening and the flange is conceivable. For this purpose, the flange stabilizer may be connected to the flange and/or to the body in the region of the opening or flange. The connection is made, for example, by friction, sticking or sealing.

The basic idea of the invention thus lies in the attachment of an additional component to a shaped article, preferably of cardboard or another fiber material. This component, i.e. the flange stabilizer, is preferably attached below the flange of the shaped article, which may serve as sealing rim.

The invention combines a reshaped article, for example a cardboard part produced by means of compression drawing, with a non-reshaped but specially cut or punched out flange stabilizer to form a two-part shaped article, for example a packaging container. The mostly ring-shaped flange stabilizer is mounted perpendicular to the container wall, i.e. the body, and in a flat manner below the flange or sealing rim on its side facing the bottom, if it is not clamped with its inner contour onto the body due to friction.

The flange stabilizer may advantageously also be made of cardboard, so that recycling is simplified. Where this is not a concern, the ring may be made of another material, such as plastic.

The flange stabilizer may be used for round and oval shaped article geometries as a very narrow ring (approx. 3-5 mm web width). For other geometries, such as a square or rectangular cross-section, a larger web width is required (approx. 4-10 mm).

Due to the essentially perpendicular arrangement relative to the body, i.e. flat below the flange or sealing rim, the flange stabilizer can be attached through friction fitting onto the body or by gluing or sticking below the sealing rim. When using a cardboard coated with a sealable material or when the flange stabilizer is made of a material that can be sealed alone, such as plastic, the ring may also be sealed to the sealing rim from below.

BRIEF DESCRIPTION OF THE DRAWINGS

The invention is explained in more detail below by way of a description of exemplary embodiments and their illustration in the corresponding drawings. In the drawings.

DETAILED DESCRIPTION OF THE PREFERRED EMBODIMENTS

Figure 1:
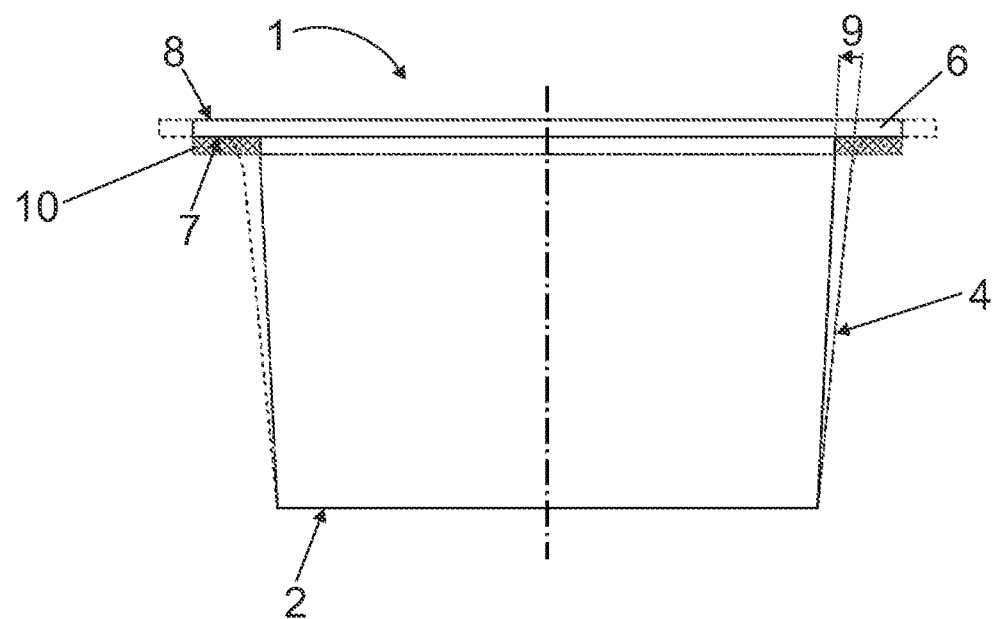
FIG. 1: is a schematic side view of an embodiment of a shaped article with flange stabilizer according to the invention.

FIG. 1 schematically shows a cross-sectional side view of an embodiment of a shaped article 1 according to the invention with a flange stabilizer 10. The shaped article 1 consists of a bottom 2, a body 4 and a flange 6, which also serves as a sealing rim (compare FIGS. 4 and 5). The flange 6 has a flange bottom side 7 facing the flange stabilizer 10 and a flange top side 8 on the opposite flat side.

Figure 3:
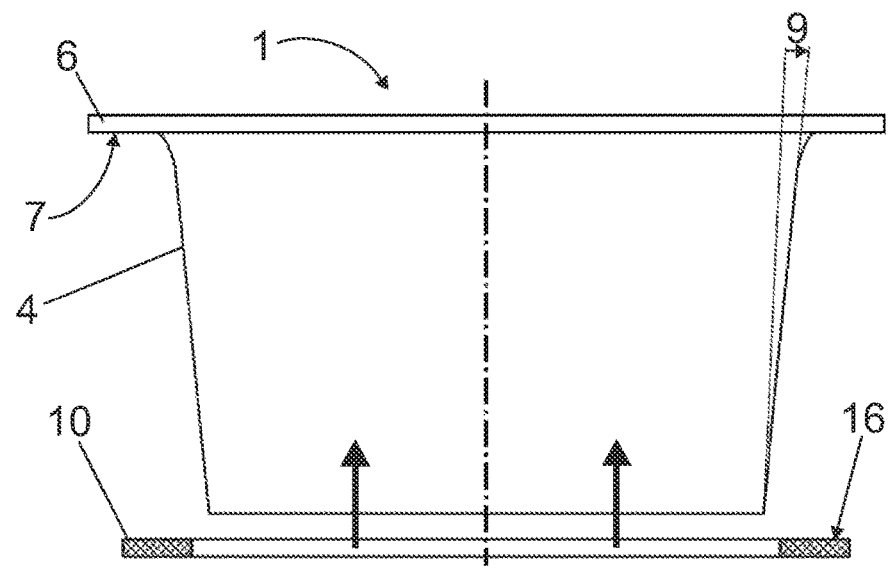
FIG. 3: is a schematic side view of an embodiment of a shaped article during attachment of a flange stabilizer.

The shape fixation 9 illustrates the extent to which the flange stabilizer 10 prevents the reverse bending that would otherwise occur after reshaping (compare FIG. 3). In this way, the flange stabilizer 10 stabilizes the shape of the shaped article 1 and prevents any undesirable change in shape, even under changed climatic conditions.

Figure 2:
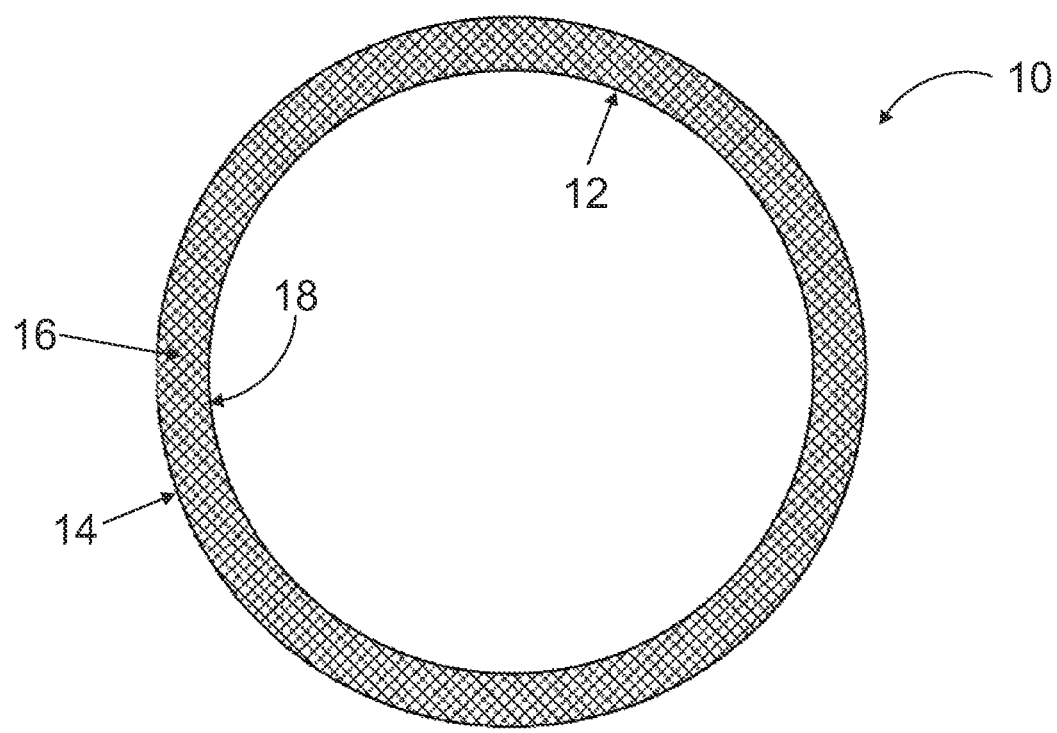
FIG. 2: is a schematic top view of an embodiment of a flange stabilizer.

FIG. 2 schematically shows a top view of an embodiment of a flange stabilizer 10. The latter comprises an inner ring 12, which is connected to the shaped article 1 via the body 4 and absorbs the forces of the body 4 that occur due to the reverse bending and during the shape fixation 9. A first flat side 16 is used to connect to the flange bottom side 7 of the shaped article 1. Arranged opposite the flat side 16, the flange stabilizer 10 has a second flat side 18, and furthermore also an outer ring 14.

FIG. 3 schematically shows a cross-sectional side view of an embodiment of a shaped article 1 during attachment of a flange stabilizer 10. To do this, the flange stabilizer 10 is slipped upwards in the direction of the arrow over the body 4 towards the flange 6 and against its bottom side. Then, the connection between the first flat side 16 of the flange stabilizer 10 and the flange bottom side 7 is made. The slipping of the flange stabilizer 10 onto the body 4 is also accompanied by the shape fixation 9 by reversing the undesired reverse bending.

After the flange stabilizer 10 has been slipped onto the shaped article 1 from below, i.e. from the bottom side, it is fastened and henceforth holds the shaped article 1 stably in its shape in the region of its opening. During the slip-on operation, the reverse bending is reversed by the amount of the shape fixation 9. The flange stabilizer 10 may be fastened by friction or friction fitting at the body 4, by adhesive at the body 4 or the flange 6, or by sealing at the flange 6 as an alternative to the above options.

Figure 4:
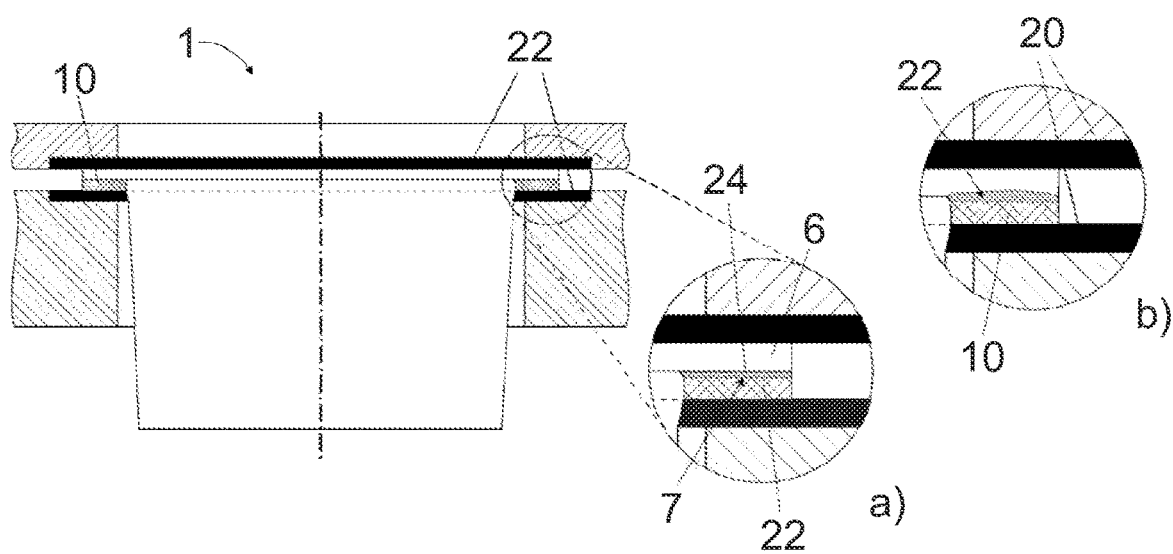
FIG. 4: is a schematic cross-sectional side view of an embodiment of a shaped article according to the invention during sealing of a flange stabilizer.

FIG. 4 schematically shows a cross-sectional side view of an embodiment of a shaped article 1 according to the invention during sealing of a flange stabilizer 10. Two detailed illustrations show the region of the sealing seam 22 in each case before and after the sealing process. The flange stabilizer 10 is sealed independently below the flange 6 or sealing rim of the shaped article 1, on the flange bottom side 7.

In this process, the flange stabilizer 10, which is itself sealable or is provided with a sealable coating, is sealed to the bottom side of the flange 6 or sealing rim, i.e. the flange bottom side 7, of the shaped article 1 by means of standard industrial sealing tools 20 (e.g. by heat contact). Since the sealing seam 22 does not have to be tight at this point, nor does it have to withstand large mechanical loads, the seam quality is of little importance. This makes the sealing process very simple.

Independent sealing is advantageous if the shaped article 1 is used as a container and is to be stored or transported to the filling plant in a state in which it is still unfilled and not sealed. If the material of the shaped article 1 itself is provided with a sealable coating 24, the sealing of the flange stabilizer 10 must take place at temperatures below the melting point of the sealing layer of the shaped article 1. It has been shown, for example, that a flange stabilizer 10 with PE coating and a shaped article 1 with PET coating represent a suitable material combination for this purpose.

Figure 5:
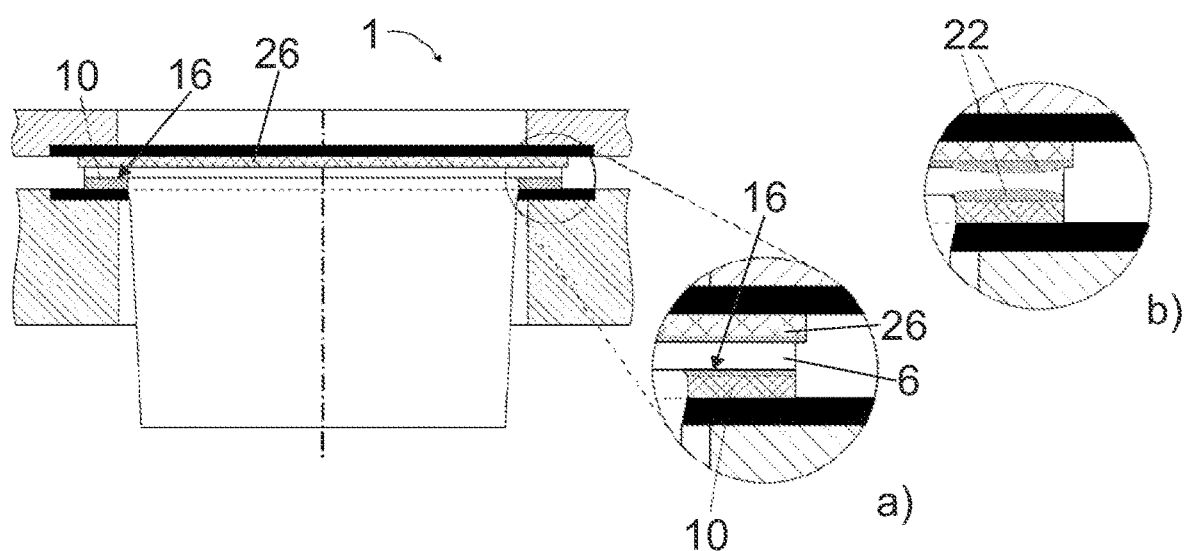
FIG. 5: is a schematic cross-sectional side view of an embodiment of a shaped article according to the invention during sealing of a flange stabilizer together with a lid.

FIG. 5 schematically shows a side view of an embodiment of a shaped article 1 according to the invention during the sealing of the first flat side 16 of a flange stabilizer 10 together with a lid 26 to the flange 6. Detailed illustrations a) and b) show the region of the sealing seam 22 before and after the sealing process, respectively. In this case, the sealing of the flange stabilizer 10 takes place simultaneously with the sealing of the shaped article 1 with the lid 26, which acts as a sealing plate.

The process of sealing the flange stabilizer 10 may thus be supplemented by closing the shaped article 1 through sealing. No additional operation is required in the process. It should only be noted that the sealing time is increased by the additional insulating effect of the material of the flange stabilizer 10. The seam quality when sealing the flange stabilizer 10 is of secondary importance. Therefore, it is not expected that the sealing parameters (e.g. pressure, temperature) have to be changed significantly compared to sealing without flange stabilizer 10.

Another embodiment has a deviating outer contour 14 of the flange stabilizer 10. In this case, a projection in this embodiment has the form of a protruding corner that serves as a handle or design element. Another embodiment has a lid that is connected to the flange 6.

In a further embodiment, the projection has a larger surface area and serves as an information carrier for holding inscriptions or notices.

LIST OF REFERENCE NUMERALS 1 shaped article
2 bottom
4 body
6 flange, sealing rim
7 flange bottom side
8 flange top side
9 form fixation
10 flange stabilizer
12 inner contour, inner ring
14 outer contour, outer ring
15 web width
16 first flat side
18 second flat side
20 sealing tool
22 sealing seam
24 sealable coating
26 lid

The invention claimed is:

1. A shaped article which is shaped from a flat fiber material and has a bottom (2), a body (4) and an opening, the opening being surrounded by a circumferential flange (6), characterized in that the shaped article (1) comprises a flange stabilizer (10) which is attached to a second flat side (18) of the flange (6) facing towards the bottom (2), the flange stabilizer (10) being disc-shaped and having an inner contour (12) which corresponds to the desired cross-sectional shape of the shaped article (1) in the region of the opening and can be stripped over the body (4) in the region of the bottom (2) up to the flange (6), wherein flat sides (16, 18) of the flange stabilizer (10) extend essentially parallel to the flange (6) and wherein the flange stabilizer (10) defines and stabilizes the cross-sectional shape of the body (4) in the region of the opening and the flange (6).

2. The shaped article according to claim 1, wherein the shaping has been performed by compression drawing.

3. The shaped article according to claim 1, wherein the flange stabilizer (10) is connected to the flange (6) by frictional fitting, gluing, sticking or sealing, wherein for sealing the flange (6) is configured as a sealing rim.

4. The shaped article according to claim 3, wherein a lid (26) is sealed onto the sealing rim to close the opening.

5. The shaped article according to claim 1, wherein the flange stabilizer (10) is cut out of a flat fiber material or plastic and with closed inner contour (12) and closed outer contour (14).

6. The shaped article according to claim 1, wherein at least the inner contour (12) of the flange stabilizer (10) is circular or oval and the flange stabilizer (10) has a web width (15) of 3 to 5 mm.

7. The shaped article according to claim 1, wherein at least the inner contour (12) of the flange stabilizer (10) is shaped other than circular or oval and the flange stabilizer (10) has a web width (15) of 4 to 10 mm.

8. The shaped article according to claim 1, wherein the inner contour (12) and the outer contour (14) differ from each other in such a way that a projection is formed.

* * * * *